United States Patent
Choho et al.

(10) Patent No.: US 11,275,541 B2
(45) Date of Patent: Mar. 15, 2022

(54) IMAGE FORMING APPARATUS EQUIPPED WITH COMMUNICATION FUNCTION, CONTROL METHOD THEREFOR, AND STORAGE MEDIUM

(71) Applicant: CANON KABUSHIKI KAISHA, Tokyo (JP)

(72) Inventors: Satoshi Choho, Tokyo (JP); Teppei Hasegawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/744,361

(22) Filed: Jan. 16, 2020

(65) Prior Publication Data

US 2020/0249887 A1   Aug. 6, 2020

(30) Foreign Application Priority Data

Feb. 4, 2019   (JP) .............................. JP2019-017990

(51) Int. Cl.
*G06F 3/12* (2006.01)
*H04N 1/00* (2006.01)

(52) U.S. Cl.
CPC .......... *G06F 3/1236* (2013.01); *G06F 3/1204* (2013.01); *H04N 1/00413* (2013.01); *H04N 2201/0039* (2013.01); *H04N 2201/0046* (2013.01)

(58) Field of Classification Search
CPC . G06F 3/1236; G06F 3/1204; H04N 1/00413; H04N 2201/0039; H04N 2201/0046

USPC ........................................................ 358/1.15
See application file for complete search history.

(56) References Cited

U.S. PATENT DOCUMENTS

| | | | | |
|---|---|---|---|---|
| 8,384,949 | B2* | 2/2013 | Ooba | G03G 15/5087 358/1.9 |
| 9,292,806 | B2* | 3/2016 | Nakazawa | G06Q 10/06 |
| 2010/0103450 | A1* | 4/2010 | Yanazume | H04N 1/2183 358/1.15 |
| 2013/0141753 | A1* | 6/2013 | Kamoi | G06F 21/629 358/1.14 |
| 2015/0077791 | A1* | 3/2015 | Asai | H04N 1/00437 358/1.15 |
| 2017/0078523 | A1* | 3/2017 | Gupta | H04L 61/2007 |
| 2018/0352097 | A1* | 12/2018 | Maeda | G06F 16/986 |

FOREIGN PATENT DOCUMENTS

| | | |
|---|---|---|
| JP | 2008210103 A | 9/2008 |
| JP | 2009020810 A | 1/2009 |

* cited by examiner

*Primary Examiner* — Neil R McLean
(74) *Attorney, Agent, or Firm* — Rossi, Kimms & McDowell LLP

(57) ABSTRACT

An image forming apparatus which is capable of reducing input errors in network settings. The image forming apparatus has a plurality of network I/Fs and connects an image formation control apparatus to one of the plurality of network I/Fs. A display control unit controls display on a screen relating to network settings on the image forming apparatus. Based on selection of a network I/F to which the image formation control apparatus is to be connected, the display control unit determines what to display on the screen relating to network settings on the image forming apparatus.

11 Claims, 14 Drawing Sheets

FIG. 9A

901 NETWORK I/F 1>IP ADDRESS SETTINGS

※DFE SETTINGS ALREADY CONFIGURED  LOCK ▣

| DHCP | |
|---|---|
| IP ADDRESS | |
| SUBNET MASK | |
| GATEWAY ADDRESS | |

NETWORK I/F 2>IP ADDRESS SETTINGS

| DHCP | |
|---|---|
| IP ADDRESS | |
| SUBNET MASK | |
| GATEWAY ADDRESS | |

[ CANCEL ]   [ OK ]

FIG. 9B

902 NETWORK I/F 1>IP ADDRESS SETTINGS

※DFE SETTINGS ALREADY CONFIGURED  LOCK ▣

| DHCP | ON |
|---|---|
| IP ADDRESS | 192.168.1.2 |
| SUBNET MASK | 255.255.248.0 |
| GATEWAY ADDRESS | 192.168.1.9 |

NETWORK I/F 2>IP ADDRESS SETTINGS

| DHCP | |
|---|---|
| IP ADDRESS | |
| SUBNET MASK | |
| GATEWAY ADDRESS | |

[ CANCEL ]   [ OK ]

IMAGE FORMING APPARATUS EQUIPPED WITH COMMUNICATION FUNCTION, CONTROL METHOD THEREFOR, AND STORAGE MEDIUM

BACKGROUND OF THE INVENTION

Field of the Invention

The present invention relates to an image forming apparatus, a control method therefor, and a storage medium.

Description of the Related Art

An MFP which is an image forming apparatus equipped with a communication function is known. The MFP has a network I/F for carrying out data communications with an external apparatus (see, for example, Japanese Laid-Open Patent Publication (Kokai) No. 2008-210103). For example, a DFE (Digital Front End) which is an image formation control apparatus is connected to the network I/F. The MFP carries out data communications with an external apparatus such as a client PC via the DFE. In recent years, an MFP equipped with a plurality of network I/Fs has been developed. Different networks are connected to the respective network I/Fs of this MFP (see, for example, Japanese Laid-Open Patent Publication (Kokai) No. 2009-20810). For example, a first network for the MFP to carry out communications via the DFE is connected to one of the network I/Fs, and a second network different from the first network is connected to another one of the network I/Fs. On these networks, different IP addresses are assigned to the MFP, and accordingly in the MFP, network settings for carrying out communications are configured for each of the network I/Fs. For example, an IP address assigned to the MFP on the first network is set as a network setting on one of the network I/Fs, and an IP address assigned to the MFP on the second network is set as a network setting on another one of the network I/Fs.

As described above, for the MFP equipped with a plurality of network I/Fs, network settings need to be configured for each of the network I/Fs, and hence setting operations become complicated. This may cause input errors in some network settings; for example, an IP address of the MFP supposed to be set for one network I/F is erroneously set as an IP address of another network I/F.

SUMMARY OF THE INVENTION

The present invention provides an image forming apparatus and a control method therefor which are capable of reducing input errors in network settings, as well as a storage medium.

Accordingly, the present invention provides an image forming apparatus that has a plurality of network I/Fs and connects an image formation control apparatus to one of the plurality of network I/Fs, comprising at least one processor and/or a circuit configured to function as a display control unit that controls display on a screen relating to network settings on the image forming apparatus, wherein based on selection of a network I/F to which the image formation control apparatus is to be connected, the display control unit determines what to display on the screen relating to network settings on the image forming apparatus.

According to the present invention, input errors in network settings are reduced.

Further features of the present invention will become apparent from the following description of exemplary embodiments (with reference to the attached drawings).

BRIEF DESCRIPTION OF THE DRAWINGS

FIGS. 9A and 9B are views showing other examples of the network setting screen which is displayed on the operating unit in FIG. 4.

DESCRIPTION OF THE EMBODIMENTS

Embodiments of the present invention will now be described in detail with reference to the drawings. First, a description will be given of a first embodiment of the present invention.

Figure 1:
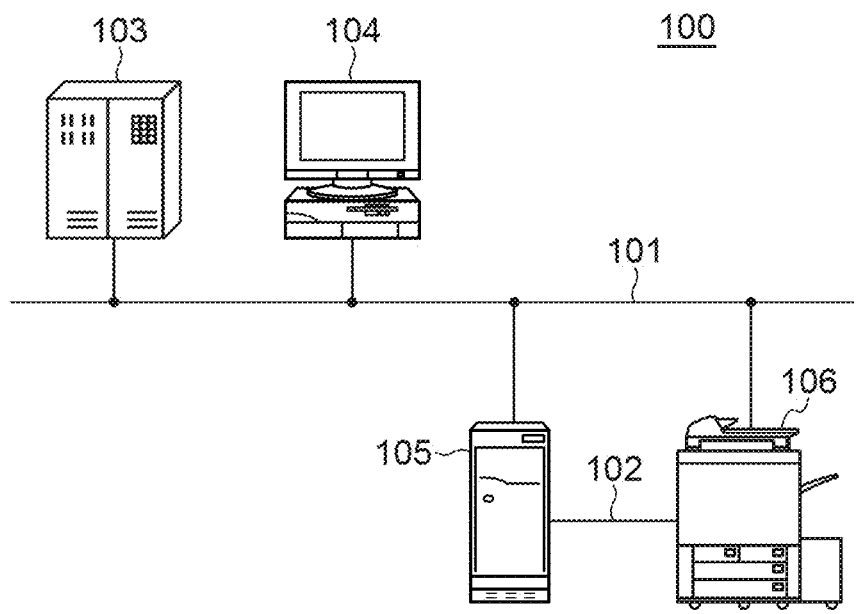
FIG. 1 is a network diagram schematically showing an arrangement of a printing system including an MFP which is an image forming apparatus according to a first embodiment of the present invention.

FIG. 1 is a network diagram schematically showing an arrangement of a printing system 100 including an MFP 106 which is an image forming apparatus according to a first embodiment of the present invention.

Referring to FIG. 1, the printing system 100 has an external server 103, a client PC 104, a DFE 105 which is an image formation control apparatus, and an MFP 106. The MFP 106 is connected to a first network 101. This enables the MFP 106 to carry out a direct communication (hereafter referred to as "the first network communication") with the external server 103 and the client PC 104 which constitute the first network 101. The MFP 106 is also connected to a second network 102. This enables the MFP 106 to carry out a communication (hereafter referred to as "the second network communication") with the external server 103 and the client PC 104 via the DFE 105 which constitutes the second network 102. In the second network 102, print images and other information are transmitted and received. It should be noted that in the present embodiment, the second network 102 may be comprised of either a single apparatus i.e. the DFE 105 or a plurality of apparatuses including the DFE 105.

The external server 103 has a file server function. The client PC 104 generates print data expressed in a page-description language (PDL). The client PC 104 sends the print data, for example, to the DFE 105 via the first network 101. The DFE 105 has a packet transfer function for the MFP 106 to implement the second network communication with the client PC 103 and others. The DFE 105 carries out, for example, a rasterizing process on the print data received from the client PC 104 and sends the processed print data to the MFP 106. The MFP 106 carries out a printing process based on the print data received from the DFE 105. By carrying out the first network communication, the MFP 106 is able to directly communicate with the client PC 104 and the external server 103 without involving the DFE 105. For example, the MFP 106 receives an instruction to perform a function of the MFP 106 from the client PC 104, which is operated by a user, via the first network 101 and also directly sends data to the external server 103.

Figure 2:
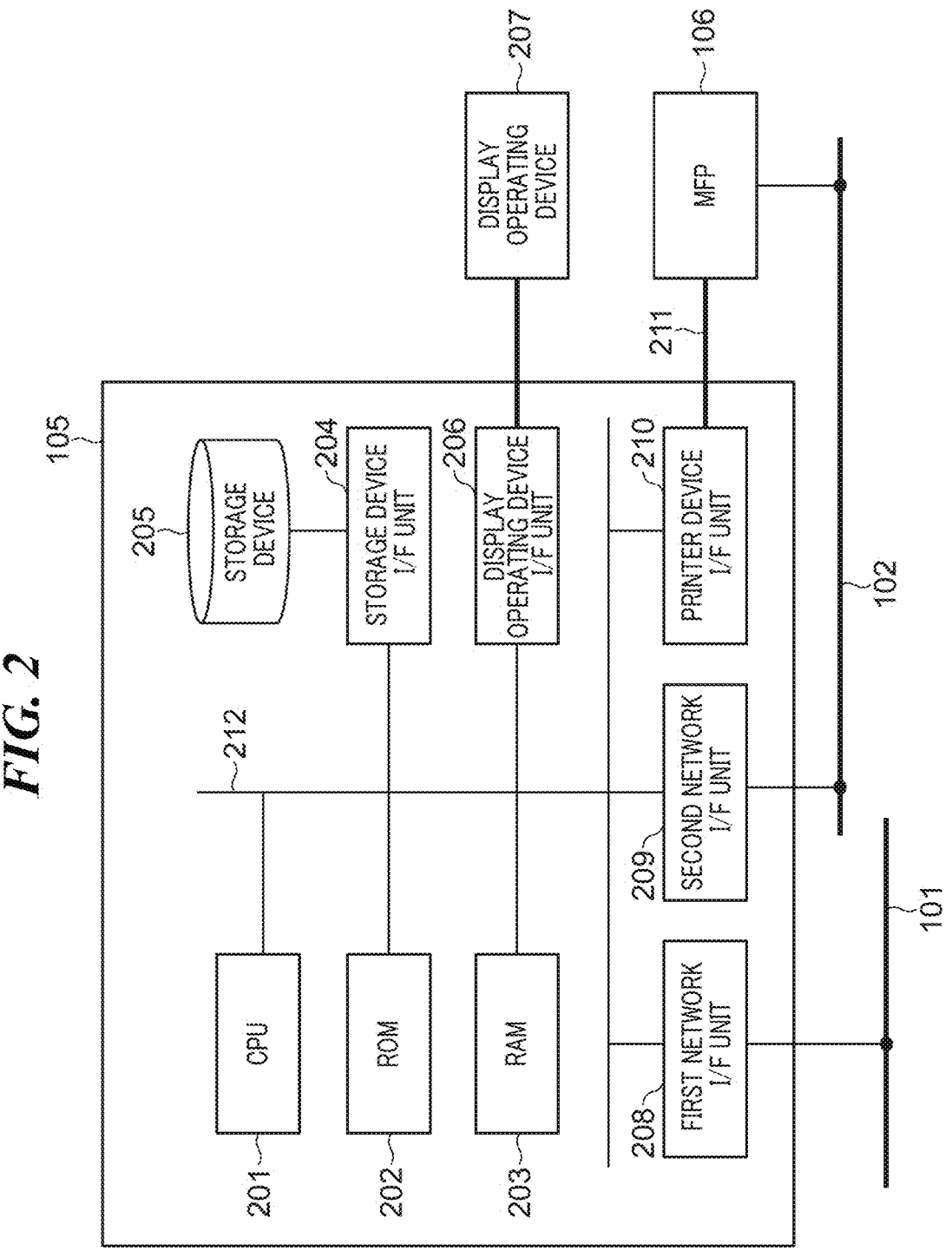
FIG. 2 is a block diagram schematically showing a hardware arrangement of a DFE in FIG. 1.

FIG. 2 is a block diagram schematically showing a hardware arrangement of the DFE 105 in FIG. 1. Referring to FIG. 2, the DFE 105 has a CPU 201, a ROM 202, a RAM 203, a storage device I/F unit 204, a storage device 205, a display operating device I/F unit 206, a first network I/F unit 208, a second network I/F unit 209, and a printer device I/F unit 210. The CPU 201, ROM 202, RAM 203, storage device I/F unit 204, display operating device I/F unit 206, first network I/F unit 208, second network I/F unit 209, and printer device I/F unit 210 are connected to one another via a bus 212.

The CPU 201 expands programs, which are stored in the ROM 202, on the RAM 203 and executes the expanded programs to control respective software modules in FIG. 3, which will be described later. The storage device I/F unit 204 controls a process in which data is stored in the storage device 205. In the storage device 205, for example, data received from the client PC 104 and the MFP 106 is stored. The display operating device I/F unit 206 is connected to a display operating device 207 via a data transfer cable. The display operating device I/F unit 206 updates information displayed on the display operating device 207 according to an instruction received from a user, a state of the DFE 105, and so forth.

For the DFE 105, a serviceperson well versed in setting procedures for the DFE 105 and the MFP 106 connects a cable of the first network 101 to one of the first network I/F unit 208 and the second network I/F unit 209 and connects a cable of the second network 102 to the other one. In the present embodiment, for example, a cable inlet of one of the first network I/F unit 208 and the second network I/F unit 209 is marked to indicate that it is to be connected to an MFP. This mark enables the serviceperson to identify the cable inlet to which a cable connecting to the MFP 106 is to be connected. Also, by referring to a position or the like of the cable inlet described in an installation manual for the DFE 105, the serviceperson identifies the cable inlet to which the cable connecting to the MFP 106 is to be connected. In the following description, for example, it is assumed that the cable of the first network 101 is connected to the cable inlet of the first network I/F unit 208, and the cable of the second network 102 is connected to the cable inlet of the second network I/F unit 209.

The first network I/F unit 208 carries out data communications with the client PC 104 and the external server 103 which constitute the connected first network 101. For example, the first network I/F unit 208 sends and receives print data, information on a configuration of the DFE 105, information on a state of the DFE 105, management information for use in monitoring network equipment, and HTML contents.

The second network I/F unit 209 carries out data communications with the MFP 106 constituting the connected second network 102. For example, the second network I/F unit 209 sends and receives data for use in managing and controlling the MFP 106 to and from the MFP 106. Examples of the data for use in managing and controlling the MFP 106 include print setting data, configuration data on the MFP 106, data on start-up and printing status of the MFP 106, sheet setting data, and management data on the MFP 106. The printer device I/F unit 210 is connected to the MFP 106 via a video cable 211 for transferring print data. The printer device I/F unit 210 transfers data on images for use in a printing process to the MFP 106 via the video cable 211. On the video cable 211, for example, values indicating shades of CMYK (cyan, magenta, yellow, black) data, values indicating image types such as a text and a photograph, and so forth are transferred.

Figure 3:
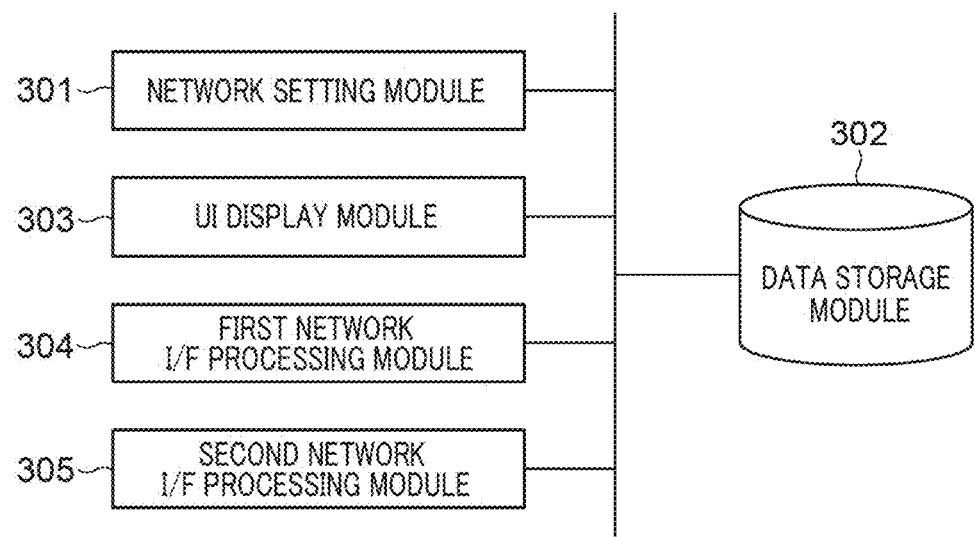
FIG. 3 is a block diagram schematically showing a software arrangement of the DFE in FIG. 1.

FIG. 3 is a block diagram schematically showing a software arrangement of the DFE 105 in FIG. 1. Referring to FIG. 3, the DFE 105 has a network setting module 301, a data storage module 302, a UI display module 303, a first network I/F processing module 304, and a second network I/F processing module 305. Processes in these software modules are implemented by the CPU 201 executing programs stored in the ROM 202. The network setting module 301 stores setting information, which is configured by the user with a UI (not shown) of the DFE 105, in the data storage module 302. The UI display module 303 generates the UI for configuring settings on the DFE 105 and GUIs such as a printing status screen. The first network I/F processing module 304 controls data communications carried out by the first network I/F unit 208. The second network I/F processing module 305 controls data communications carried out by the second network I/F unit 209.

Figure 4:
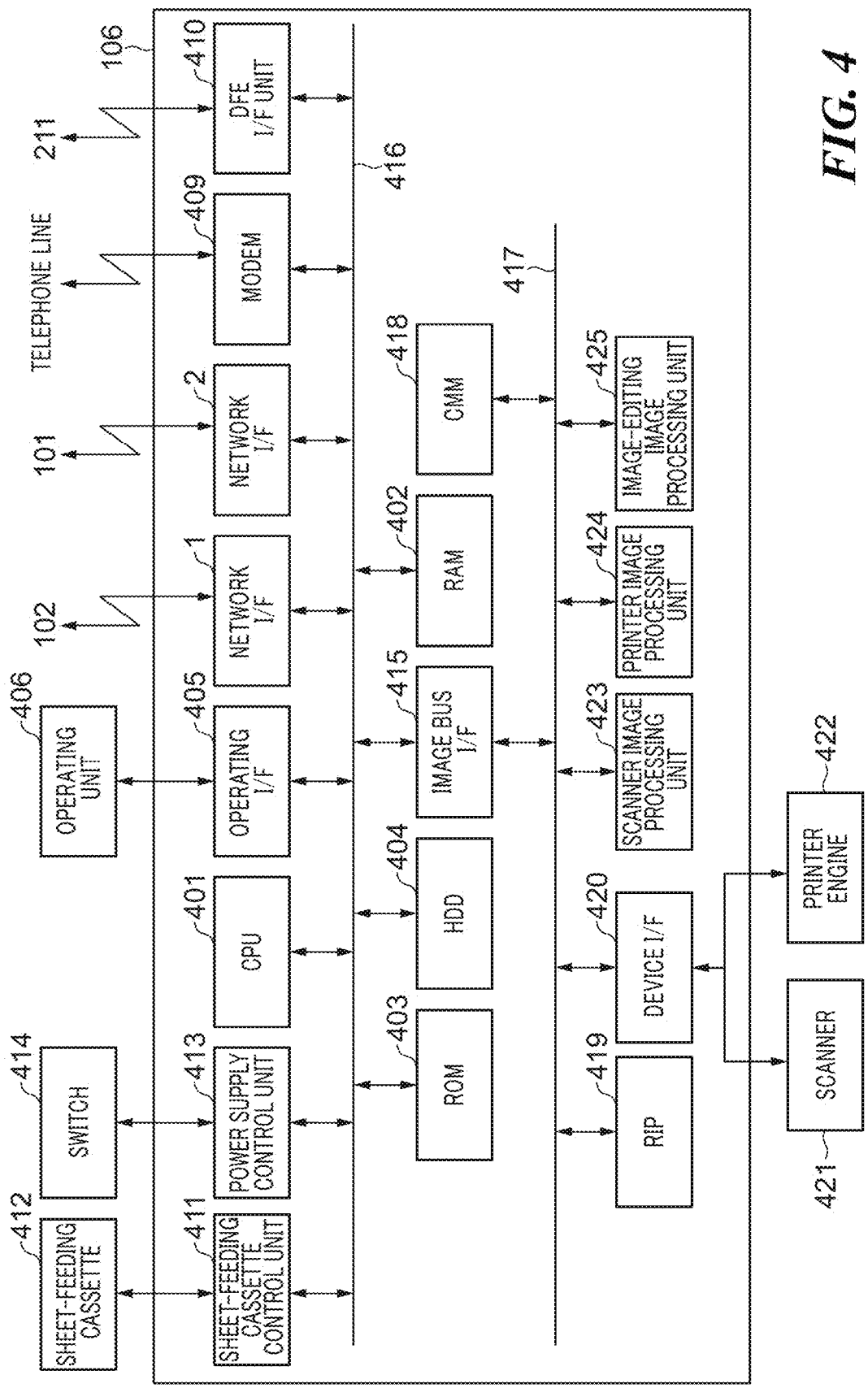
FIG. 4 is a block diagram schematically showing a hardware arrangement of the MFP in FIG. 1.

FIG. 4 is a block diagram schematically showing a hardware arrangement of the MFP 106 in FIG. 1. Referring to FIG. 4, the MFP 106 has a CPU 401, a RAM 402, a ROM 403, an HDD 404, an operating unit I/F 405, a network I/F 1, a network I/F 2, a modem 409, a DFE I/F unit 410, a sheet-feeding cassette control unit 411, a power supply control unit 413, and an image bus I/F 415. It should be noted that although in the present embodiment, it is assumed that the MFP 106 has two network I/Fs, the MFP 106 may have three or more network I/Fs. The CPU 401, RAM 402, ROM 403, HDD 404, operating unit I/F 405, network I/F 1, network I/F 2, modem 409, DFE I/F unit 410, sheet-feeding cassette control unit 411, power supply control unit 413, and image bus I/F 415 are connected to one another via a system bus 416. The MFP 106 also has a CMM 418, a RIP 419, a device I/F 420, a scanner image processing unit 423, a printer image processing unit 424, and an image-editing image processing unit 425. The image bus I/F 415, CMM 418, RIP 419, device I/F 420, scanner image processing unit 423, printer image processing unit 424, and image-editing image processing unit 425 are connected to one another via an image bus 417.

The CPU 401 is a central processing unit for controlling the entire MFP 106. For example, the CPU 401 controls software modules in FIG. 5, which will be described later, by expanding programs stored in the ROM 403 in the RAM 402 and executing the expanded programs. The RAM 402 is a system work memory for the CPU 401 to operate. The RAM 402 is also an image memory for temporarily storing image data that has been input. The ROM 403 is a boot ROM and stores a system boot program. The HDD 404 is a hard disk drive. The HDD 404 stores various types of setting information including network setting values, system software for carrying out processes, obtained image data, and so forth. Examples of the network setting values include an IP address, a subnet mask, and a gateway address of the MFP 106. The operating unit I/F 405 is an interface unit that carries out communications with an operating unit 406 connected to the MFP 106. For example, the operating unit I/F 405 outputs operating screen data to the operating unit 406. The operating unit I/F 405 also obtains information, which input by the user via the operating unit 406, and sends the obtained information to the CPU 401. The operating unit 406 is comprised of a touch-screen display or the like.

In the MFP 106, a serviceperson connects a cable of the first network 101 to one of the network I/F 1 and the network I/F 2, and the user of the MFP 106 connects a cable of the second network 102 to the other. In the present embodiment, for example, a cable inlet of one of the network I/F 1 and the network I/F 2 is marked so as to indicate that it is to be connected to a DFE, and this mark enables the serviceperson to identify the cable inlet to which a cable connecting to the DFE 105 should be connected. Alternatively, by seeing a location or the like of the cable inlet described in an installation manual for the DFE 105, the serviceperson identifies the cable inlet to which the cable connecting to the DFE 105 should be connected. In the following description, it is assumed that, for example, the cable of the second network 102 is connected to the cable inlet of the network I/F 1, and the cable of the first network 101 is connected to the cable inlet of the network I/F 2.

The network I/F 1 carries out data communications with the DFE 105 constituting the connected second network 102. For example, the network I/F 1 sends and receives print setting data, configuration data on the MFP 106, data on start-up and state of the MFP 106, sheet setting data, management data on the MFP 106 to and from the DFE 105. The network I/F 2 carries out data communications with the client PC 104 and others constituting the connected first network 101. For example, the network I/F 2 sends and receives print data, information on a configuration of the MFP 106, information on a state of the MFP 106, management information for use in monitoring network equipment, and HTML contents.

The modem 409 carries out data communications with an external apparatus (not shown) via a telephone line. The DFE I/F unit 410 is connected to the DFE 105 via the video cable 211. The DFE I/F unit 410 is connected to the DFE 105 via the video cable 211. The DFE I/F unit 410 receives data on images for use in a printing process from the DFE 105 via the video cable 211. The sheet-feeding cassette control unit 411 controls setting information on sheets stored in a sheet-feeding cassette 412 and feeding of the sheets. The power supply control unit 413 controls processes related to startup and shutdown of the MFP 106. In the MFP 106, when a switch 414 that receives instructions to start and shut down the MFP 106 is operated, the power supply control unit 413 sends an interrupt signal, which is for carrying out a process corresponding to the received operation, to the CPU 401.

The image bus I/F 415 is an interface for connecting the system bus 416 and the image bus 417, which transfers image data at high speed, to each other and is a bus bridge that converts data structures. The CMM 418 subjects image data to a color conversion process based on a profile and calibration data. The profile is, for example, a function for converting color image data expressed by a device-dependent color space into image data expressed by a device-independent color space (for example, Lab). The calibration data is data for correcting color reproduction characteristics of the MFP 106. The RIP 419 is a raster image processor and expands a page description language into a raster image. The device I/F 420 is connected to a scanner 421, which is an image input device, and a printer engine 422, which is an image output device. The device I/F 420 performs asynchronous-synchronous conversion of image data for the scanner 421 and the printer engine 422. The scanner image processing unit 423 carries out various processes such as correction, retouching, and editing on image data obtained from the scanner 421. The printer image processing unit 424 carries out such processes as correction and resolution conversion appropriate to the printer engine 422 on image data to be printed. The image-editing image processing unit 425 subjects image data to such processes as rotation and contraction/expansion.

Figure 5:
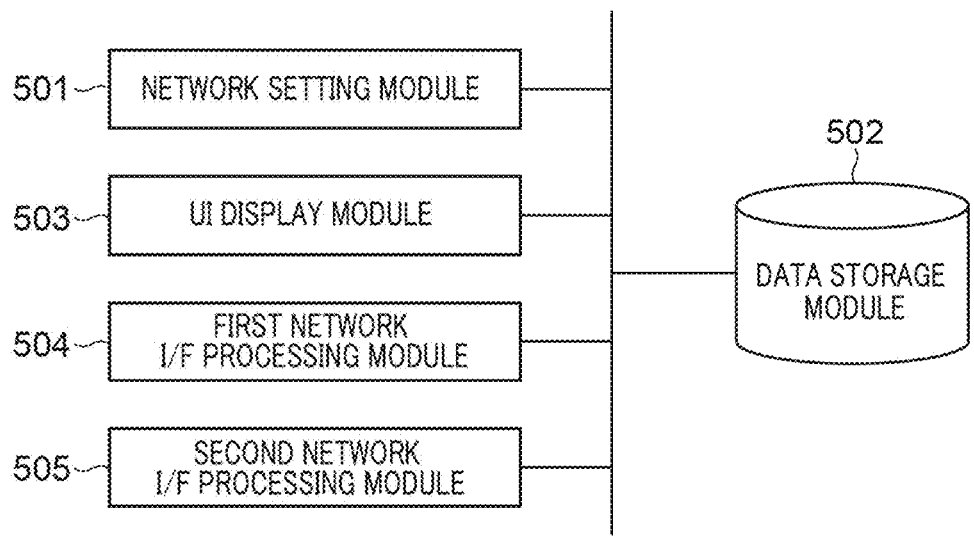
FIG. 5 is a block diagram schematically showing a software arrangement of the MFP in FIG. 1.

FIG. 5 is a block diagram schematically showing a software arrangement of the MFP 106 in FIG. 1. Referring to FIG. 5, the MFP 106 has a network setting module 501, a data storage module 502, a UI display module 503, a first network I/F processing module 504, and a second network I/F processing module 505. Processes in these software modules are implemented by the CPU 401 executing programs stored in the ROM 403. The network setting module 501 stores setting information, which is configured by the user with a UI (not shown) of the MFP 106, in the data storage module 502. The UI display module 503 generates the UI for configuring settings on the MFP 106 and GUIs such as a printing status screen. The first network I/F processing module 504 controls data communications carried out by the network I/F 2. The second network I/F processing module 505 controls data communications carried out by the network I/F 1.

Figure 6:
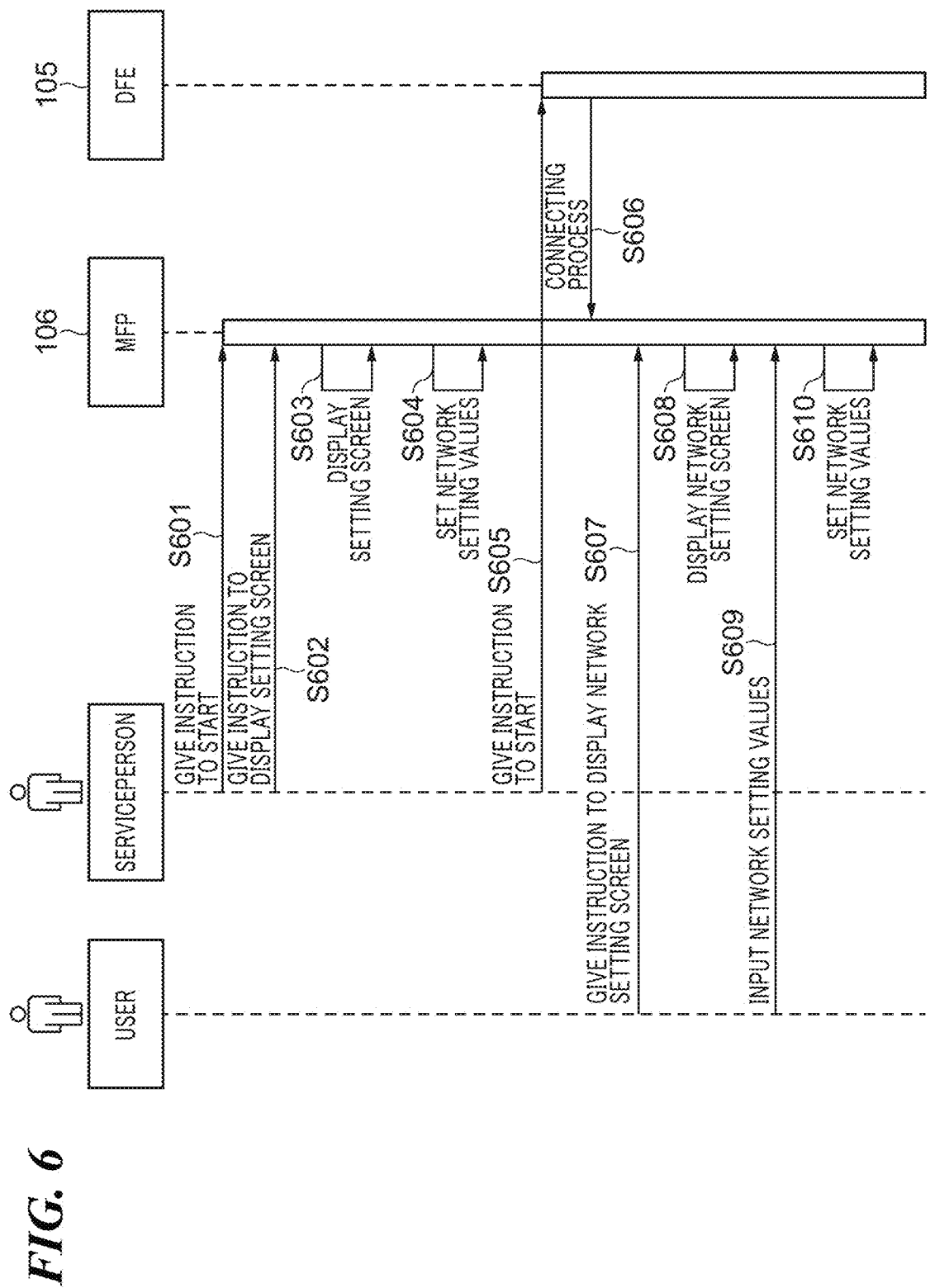
FIG. 6 is a sequence diagram showing the procedure of a process in which network settings are configured by the printing system in FIG. 1.

FIG. 6 is a sequence diagram showing the procedure of a process in which network settings are configured by the printing system 100 in FIG. 1. In the present embodiment, when installing the DFE 105 and the MFP 106, a serviceperson configures network settings on the second network communication first, and then a user configures network settings on the first network communication. The serviceperson is well versed in the setting procedures for the DFE 105 and the MFP 106, and he or she checks network settings and operations when installing the DFE 105 and the MFP 106. The user is a main user of the MFP 106 and configures various settings on the MFP 106 according to his or her usage environment and preferences. It should be noted that the user and the serviceperson are examples of operators, and they may be the same person.

Figure 7:
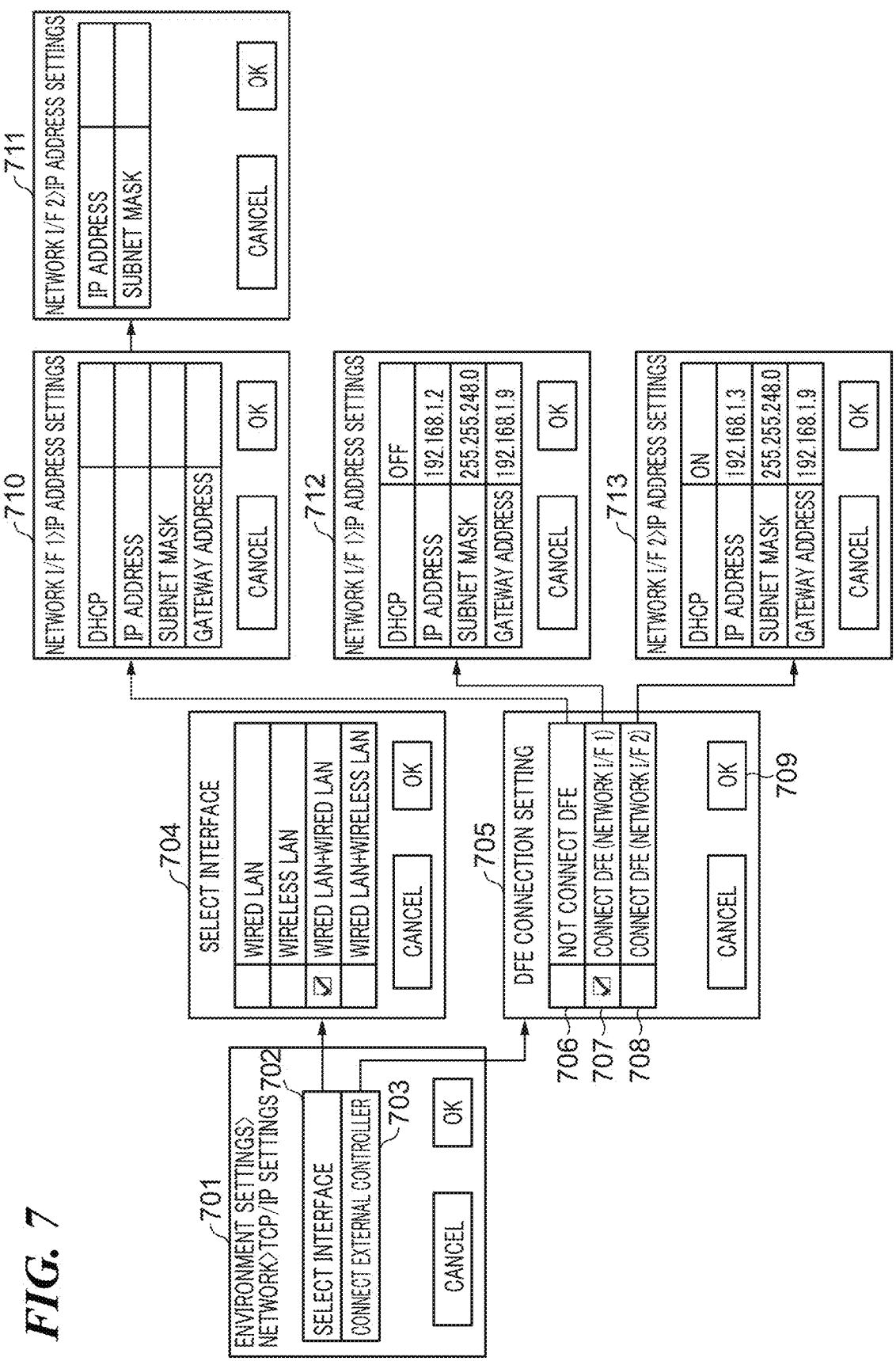
FIG. 7 is a view useful in explaining transition of screens which are displayed on an operating unit in FIG. 4.

Referring to FIG. 6, first, the serviceperson operates the switch 414 to instruct the MFP 106 to start (step S601). The serviceperson checks operations of the started MFP 106, makes adjustments, and configures the network settings on the second network communication. Upon receiving an instruction to display a setting screen for the network settings on the second network communication from the serviceperson (step S602), the MFP 106 displays a setting screen 701 in FIG. 7 on the operating unit 406 (step S603).

The setting screen 701 has an interface selection button 702 and an external controller connection button 703. The interface selection button 702 is an operating button for switching the setting screen 701 to an interface selection screen 704. The external controller connection button 703 is an operating button for switching the setting screen 701 to a DFE connection setting screen 705. By operating these operating buttons, the serviceperson switches the setting screen 701 to the interface selection screen 704 or the DFE connection setting screen 705.

On the interface selection screen 704, a type of an interface for use in communication by the MFP 106 such as a wired LAN or a wireless LAN, and the number of interfaces for use in communication by the MFP 106 are set. On the DFE connection setting screen 705, a connection setting on the DFE 105 is configured. The DFE connection setting screen 705 has checkboxes 706 to 708 and an OK button 709. The serviceperson can select one of the checkboxes 706 to 708. The checkbox 706 is selected when the DFE 105 is not connected to the MFP 106. The checkbox 707 is selected when the DFE 105 is connected to the network I/F 1. The checkbox 708 is selected when the DFE 105 is connected to the network I/F 2. On the DFE connection setting screen 705, when the serviceperson selects the OK button 709 with one of the checkboxes 706 to 708 selected, setting of the connection configuration on the DFE 105 is completed. The setting values entered on the interface selection screen 704 and the DFE connection setting screen 705 are stored in the HDD 404.

Next, the MFP 106 sets network setting values for the network I/F to which the DFE 105 is connected (step S604). The process in the step S604 is carried out when a setting value indicating that one of the checkboxes 707 and 708 has been selected on the DFE connection setting screen 705 is stored in the HDD 404.

For example, when the checkbox 707 is selected on the DFE connection setting screen 705, setting values for the second network communication which are registered in advance are automatically set as the network setting values for the network I/F 1. The setting values for the second network communication are, for example, information indicating on or off of a DHCP server that assigns an IP address to a communication apparatus, address information assigned to the MFP 106 on the second network 102. The address information includes an IP address, a subnet mask, a gateway address.

When the checkbox 708 is selected on the DFE connection setting screen 705, the setting values for the second network communication are automatically set as the network setting values for the network I/F 2.

Then, when the serviceperson instructs the DFE 105 to start (step S605), the DFE 105 carries out a connecting process in which it connects to the MFP 106. In this connecting process, the setting values for the second network communication set in the step S604 are used. When the connecting process is completed, the serviceperson completes the connection setting process for the MFP 106 and the DFE 105.

After that, when the user instructs the MFP 106 to display a network setting screen for the network I/F (step S607), the MFP 106 displays the network setting screen on the operating screen 406 in accordance with the instruction (step S608). In the step S608, the MFP 106 determines what to display on the network setting screen following the instruction based on setting values on the DFE connecting setting screen 705. For example, when the checkbox 706 is selected on the DFE connecting setting screen 705 or when one of the checkboxes 707 and 708 is selected on the DFE connecting setting screen 705, and an instruction to display a network setting screen for the network I/F to which the DFE 105 is not connected is issued in the step S607, a network setting screen is displayed on the operating unit 406 with setting fields blank as with network setting screens 710 and 711 is displayed on the operating unit 406 in step S608. On the other hand, when one of the checkboxes 707 and 708 is selected on the DFE connecting setting screen 705, and an instruction to display a network setting screen for the network I/F to which the DFE 105 is connected is issued in the step S607, a network setting screen with the setting values for the second network communication entered in setting fields like network setting screens 712 and 713 is displayed on the operating unit 406 in the step S608.

When the user enters network setting values on the displayed network setting screen (step S609), the MFP 106 configures the input network setting values as network setting values for the network I/F associated with this network setting screen (step S610). The configured network setting values are stored in the HDD 104. After that, the printing system 100 ends the present process.

According to the first embodiment described above, what to display on a network setting screen is determined based on setting values on the DFE connection setting screen 705. As a result, in the MFP 106 equipped with the plurality of network I/Fs, what to display on a network setting screen can be controlled according to a connection status of the DFE 105 so that settings cannot be complicated, and hence input errors in network settings can be reduced.

Moreover, according to the first embodiment described above, when an instruction to display a network setting screen for the network I/F to which the DFE 105 is connected is issued, the network setting screen with the setting values for the second network communication entered thereon is displayed. This causes the user to notice that the displayed network setting screen is not a screen on which setting values should be entered.

Figure 8:
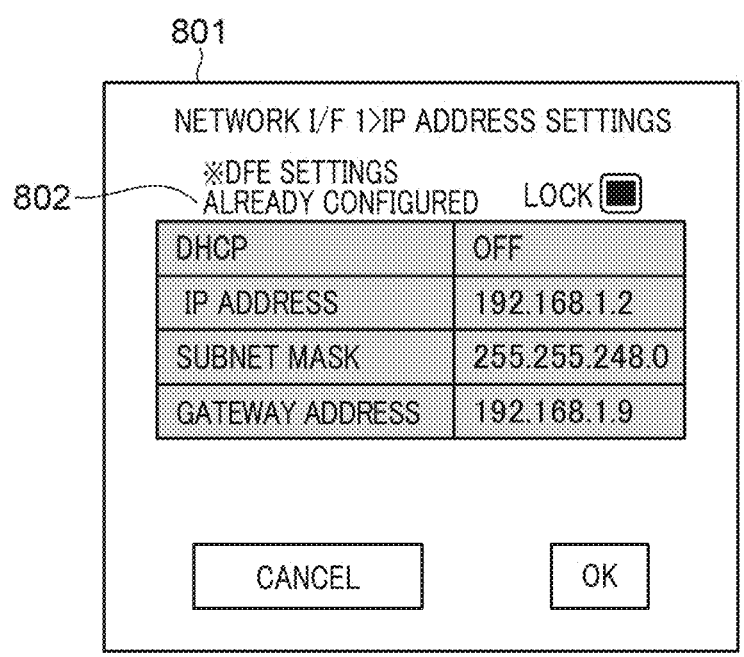
FIG. 8 is a view showing one example of a network setting screen which is displayed on the operating unit in FIG. 4.

It should be noted that the setting fields in which the setting values for the second network communication have been entered on a network setting screen may be displayed in a predetermined form to indicate that they have already been configured. For example, as with a network setting screen in FIG. 8, the setting fields in which the setting values for the second network communication have been entered are displayed in gray.

Furthermore, according to the first embodiment described above, a notification 802 in FIG. 8 indicating that the setting values for the second network communication have already been configured may be displayed. Through the control to display a screen like the network setting screen 801, the user is reliably caused to notice that the network setting screen 801 is not a screen on which setting values should be entered.

In the first embodiment described above, user's operations on setting fields on a network setting screen with the setting values for the second network communication entered may not be accepted. For example, as with the network setting screen 801, setting fields in which the setting values for the second network communication have been entered are locked to prevent the user from entering setting values in the setting fields. This avoids a situation in which the user who configures network settings on a network I/F different from the network I/F to which the DFE 105 is connected erroneously changes network settings on the network I/F to which the DFE 105 is connected.

Moreover, in the first embodiment described above, network setting values for the networks I/Fs 1 and 2 may be entered on one network setting screen as with a network setting screen 901 in FIG. 9A. On this network setting screen, for example, only setting fields in which the setting values for the second network communication have been entered may be displayed in gray as with a network setting screen in FIG. 9B. Alternatively, only those setting fields may be locked to prevent the user from entering setting values in those setting fields.

Figure 10A:
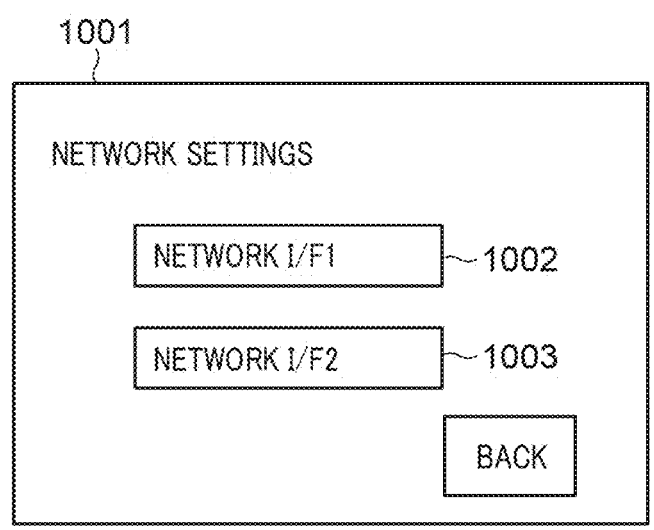
FIGS. 10A and 10B are views showing other examples of an interface selection screen which is displayed on the operating unit in FIG. 4.
Figure 10B:
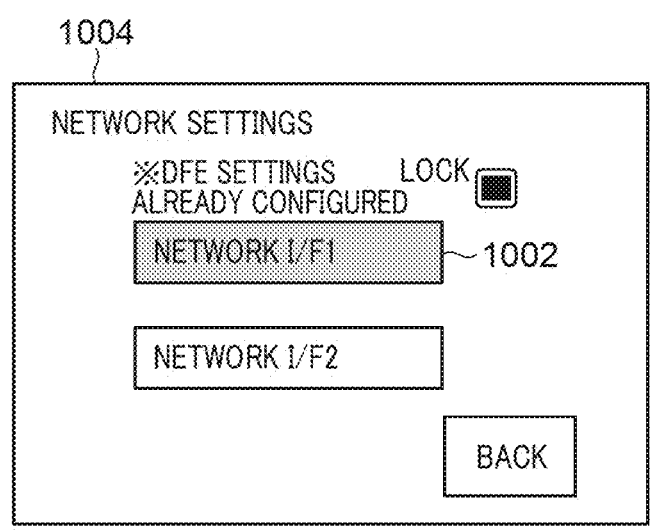

Furthermore, in the first embodiment described above, a predetermined operation in which an instruction to display a network setting screen on which the setting values for the second network communication have been entered may not be accepted. For example, in the MFP 106, a user's operation on an interface setting screen 1001 in FIG. 10A is accepted as an instruction to display a network setting screen. The interface setting screen 1001 has operating buttons 1002 and 1003. When the operating button 1002 is selected, a network setting screen for configuring network setting values for the network I/F 1 is displayed on the operating unit 406. When the operating button 1003 is selected, a network setting screen for configuring network setting values for the network I/F 2 is displayed on the operating unit 406. In the present embodiment, for example, as with an interface setting screen 1004 in FIG. 10B, the operating button 1002 for displaying the network setting screen for the network I/F to which the DFE 105 is connected is displayed in gray, or the operating button 1002 is locked. This reliably avoids a situation in which the user who configures network settings on a network I/F different from the network I/F to which the DFE 105 is connected erroneously changes network settings on the network I/F to which the DFE 105 is connected.

Next, a description will be given of a process which is carried out when setting values on the DFE connection setting screen 705 have been changed.

Figure 11:
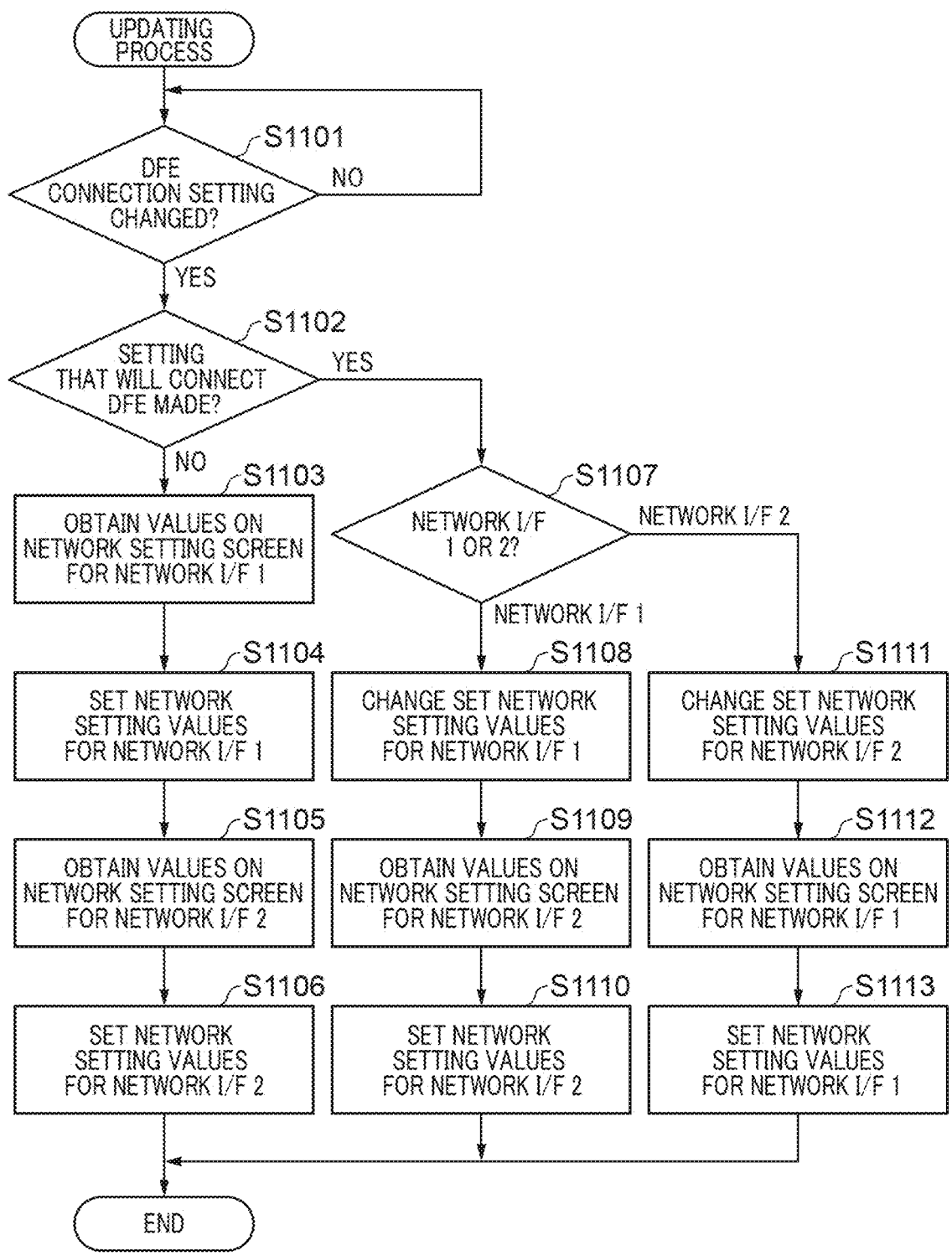
FIG. 11 is a flowchart showing the procedure of an updating process which is carried out by the MFP in FIG. 1.

FIG. 11 is a flowchart showing the procedure of an updating process which is carried out by the MFP 106 in FIG. 1. The updating process in FIG. 11 is implemented by the CPU 401 of the MFP 106 executing a program stored in the ROM 403.

Referring to FIG. 11, the CPU 401 determines whether or not a connection setting on the DFE 105 have been changed (step S1101). The CPU 101 stands by until the connection setting on the DFE 105 has been changed. In the step S1101, for example, when setting values on the DFE connection setting screen 705 have been changed, the CUP 401 determines that the connection setting on the DFE 105 has been changed. When the connection setting on the DFE 105 has been changed (YES in the step S1101), the CPU 401 determines whether or not the connection setting is a setting that will connect DFE 105 is to be connected (step 1102). In the step S1102, for example, when one of the checkboxes 707 and 708 is selected on the DFE connection setting screen 705, the CPU 401 determines that the connection setting that will connect DFE 105 has been made. On the other hand, when the checkbox 706 is selected on the DFE connection setting screen 705, the CPU 401 determines that the connection setting that will connect DFE 105 has not been made.

As a result of the determination in the step S1102, when the connection setting that will connect DFE 105 has not been made, the CPU 401 displays the network setting screen for the network I/F 1 on the operating unit 406 in accordance with an instruction from the user. The CPU 401 obtains values entered on the network setting screen for the network I/F 1 by the user (step S1103) and sets network setting values for the network I/F 1 (step S1104). Specifically, the CPU 401 sets the obtained values as the network setting values for the network I/F 1. Then, the CPU 401 displays the network setting screen for the network I/F 2 on the operating unit 406 in accordance with an instruction from the user. The CPU 401 obtains values entered on the network setting screen for the network I/F 2 by the user (step S1105) and configures network setting values for the network I/F 2 (step S1106). Specifically, the CPU 401 sets the obtained values as the network setting values for the network I/F 2. After that, the CPU 401 ends the present process.

As a result of the determination in the step S1102, when the connection setting is the setting that will connect DFE 105 is to be connected, the CPU 401 determines whether the DFE 105 is connected to the network I/F1 or I/F 2 (step S1107).

As a result of the determination in the step S1107, when the DFE 105 is connected to the network I/F1, the CPU 401 changes the network setting values for the network I/F 1 to the setting values for the second network communication (step S1108). The CPU 401 then displays the network setting screen for the network I/F 2 on the operating unit 406 in accordance with an instruction from the user. It should be noted that in the present embodiment, when the user gives an instruction to display the network setting screen for the network I/F 1 after the process is carried out in the step S1108, the network setting screen 712 with the setting values for the second network communication entered is displayed on the operating unit 406.

The CPU 401 then obtains values entered on the network setting screen for the network I/F 2 by the user (step S1109) and sets network setting values for the network I/F 2 (step S1110). Specifically, the CPU 401 sets the obtained values as the network setting values for the network I/F 2. After that, the CPU 401 ends the present process.

As a result of the determination in the step S1107, when the DFE 105 is connected to the network I/F2, the CPU 401 changes the network setting values for the network I/F 2 to the setting values for the second network communication (step S1111). The CPU 401 then displays the network setting screen for the network I/F 1 on the operating unit 406 in accordance with an instruction from the user. It should be noted that in the present embodiment, when the user gives an instruction to display the network setting screen for the network I/F 2 after the process is carried out in the step S1111, the network setting screen 713 with the setting values for the second network communication entered is displayed on the operating unit 406.

The CPU 401 then obtains values entered on the network setting screen for the network I/F 1 by the user (step S1112) and sets network setting values for the network I/F 1 (step S1113). Specifically, the CPU 401 sets the obtained values as the network setting values for the network I/F 1. After that, the CPU 401 ends the present process.

By carrying out the process in FIG. 11 described above, what to display on a network setting screen can be controlled such that setting does not become complicated, and as a result, input errors in network settings can be reduced.

Figure 12:
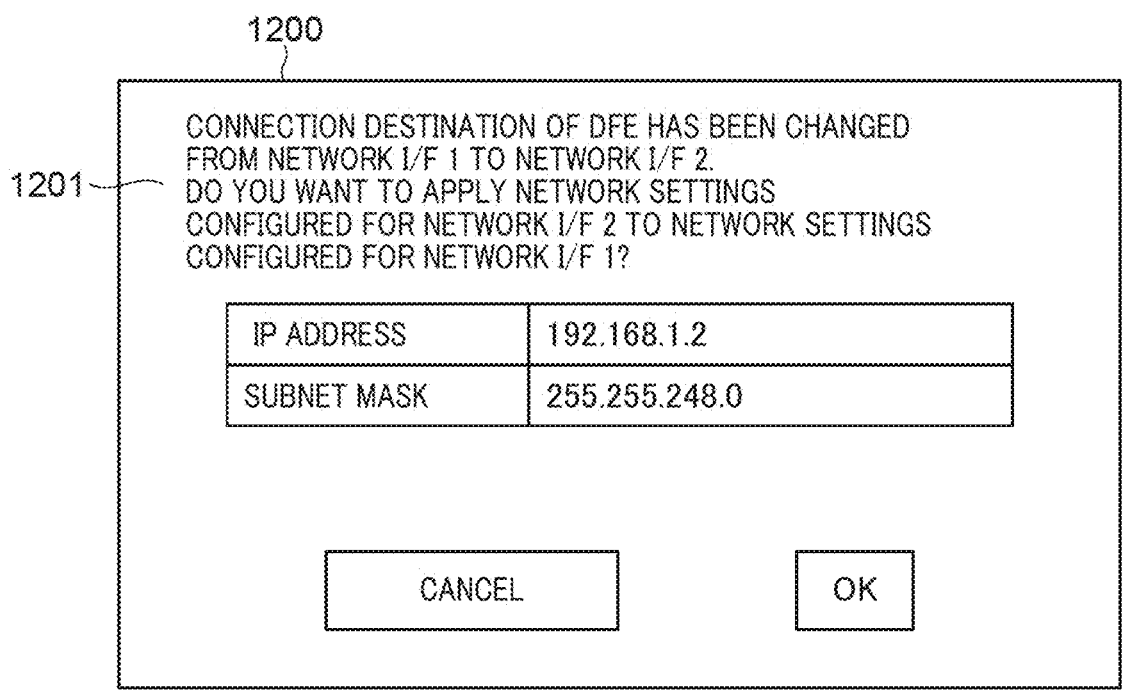
FIG. 12 is a view showing an example of a notification screen which is displayed on the operating unit in FIG. 4.

Moreover, in the first embodiment described above, when the setting on the DFE connection setting screen 705 has been changed from the setting of the checkbox 707 to the setting of the checkbox 708 or changed from the setting of the checkbox 708 to the setting of the checkbox 707, a notification screen 1200 in FIG. 12 may be displayed on the operating unit 406. The notification screen 1200 includes, for example, a message 1201 that asks the user if the network setting values for the network I/F2 will be used as the network setting values for the network I/F 1 when the setting has been changed from the checkbox 707 to the checkbox 708. This enables the serviceperson to, for example, reconnect networks that have been connected to the network I/Fs 1 and 2 by mistake, easily configure appropriate network setting values for the respective network I/Fs 1 and 2 using setting values for the second network communication and original network setting values.

A description will now be given of a second embodiment of the present invention. The second embodiment is basically the same as the first embodiment described above in terms of constructions and operations. Features of constructions and operations that are the same as those in the first embodiment will thus not be described, only constructions and operations different from those of the first embodiment being described below.

Here, although in the first embodiment, what to display on a network setting screen is determined based on a setting value on the DFE connection setting screen 705, but if the user forgets to make a setting on the DFE connection setting screen 705, what to display on a network setting screen cannot be appropriately determined.

On the contrary, in the second embodiment, what to display on a network setting screen is determined based on detection of link-up of the second network 102.

Figure 13:
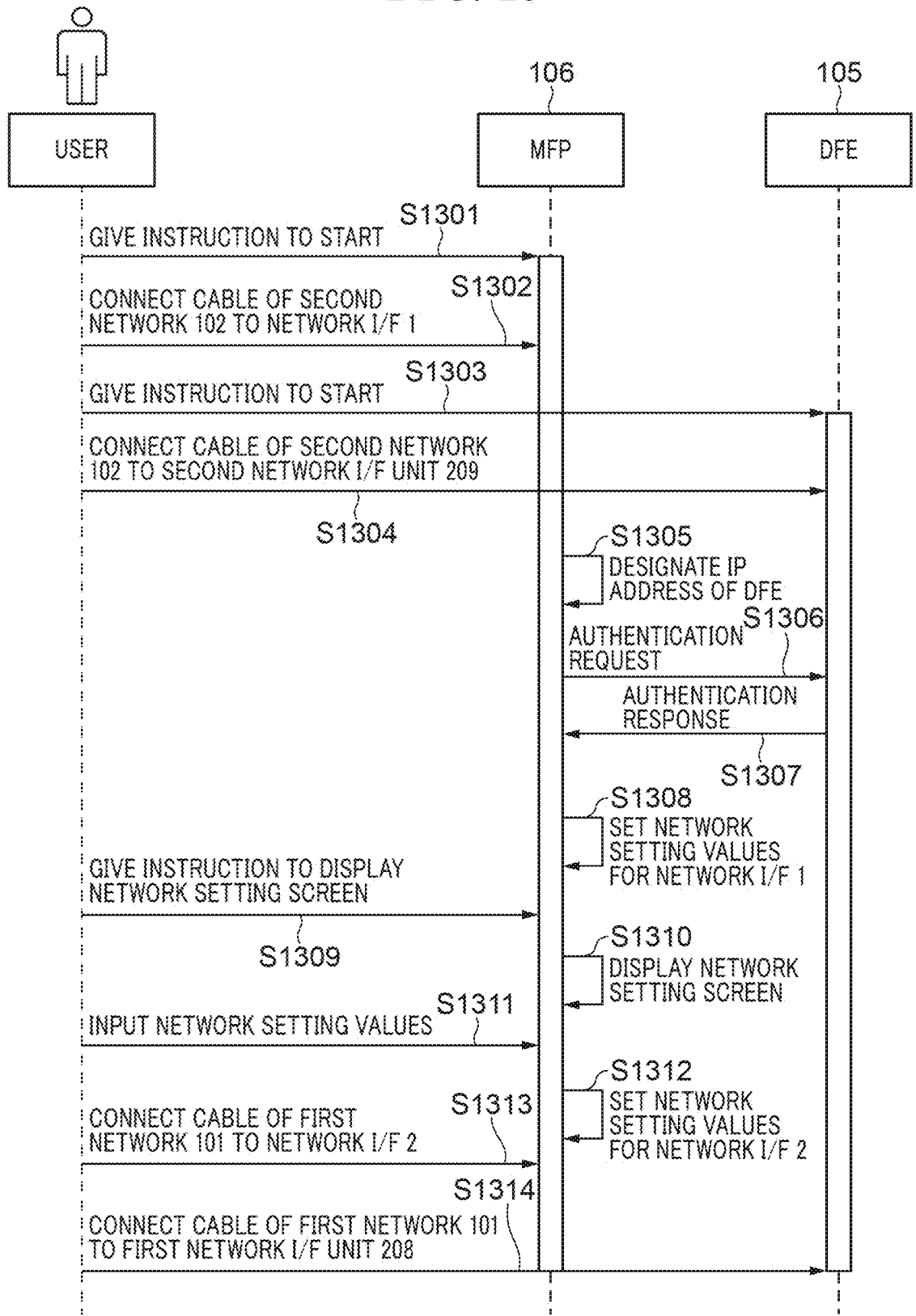
FIG. 13 is a sequence diagram showing a process in which network settings are configured by the printing system including the MFP according to a second embodiment.

FIG. 13 is a sequence diagram showing the procedure of a process in which network settings are configured by the printing system 100 including the MFP 106 according to the second embodiment. It should be noted that FIG. 13 shows case where only a user operates the MFP 106, but, a serviceperson and a user may operate the MFP 106 as with the process in FIG. 6 described above.

Referring to FIG. 13, first, the user instructs the MFP 106 to start (step S1301) and connects the cable of the second network 102 to the network I/F 1 of the MFP 106 (step S1302). Next, the user instructs the DFE 105 to start (step S1303) and connects the cable of the second network 102 to the second network I/F unit 209 of the DFE 105 (step S1304). As a result, the MFP 106 and the DFE 105 are connected together via the cable of the second network 102.

Then, upon sensing link-up of the second network 102, the MFP 106 designates an IP address of the DFE 105 on the second network 102 (step S1305). After that, the MFP 106 sends an authentication request to the DFE 105 (step S1306). Upon receiving the authentication request, the DFE 105 performs authentication of the MFP 106, and when the authentication is successful, the DFE 105 returns an authentication response to the MFP 106 (step S1307). The MFP 106 that has received the authentication response configures network setting values for the network I/F 1 (step S1308). Specifically, the MFP 106 configures network setting values, which include an IP address assigned to the MFP 106 on the second network 102, as the network setting values for the network I/F 1. Thus, the MFP 106 internally configures settings associated with the checkbox 707 on the DFE connection setting screen 705 without requiring the user to configure those settings.

After that, when the user instructs the MFP 106 to display a network setting screen for the network I/F 2 (step S1309), the MFP 106 displays the network setting screen for the network I/F 2 on the operating unit 506 (step S1310). When the user has entered network setting values on the network setting screen (step S1311), the MFP 106 configures the network setting values for the network I/F 2 (step S1312). Specifically, the MFP 106 configures the input network setting values as network setting values for the network I/F 2. Then, the user connects a cable, which is for connecting with the first network 101, to the network I/F 2 (step S1313). After that, the user connects a cable, which is for connecting with the first network 101, to the first network I/F unit 208 of the DFE 105 (step S1314). This enables the MFP 106 and the DFE 105 to carry out the first network communication. After that, the printing system 100 ends the present process.

Figure 14:
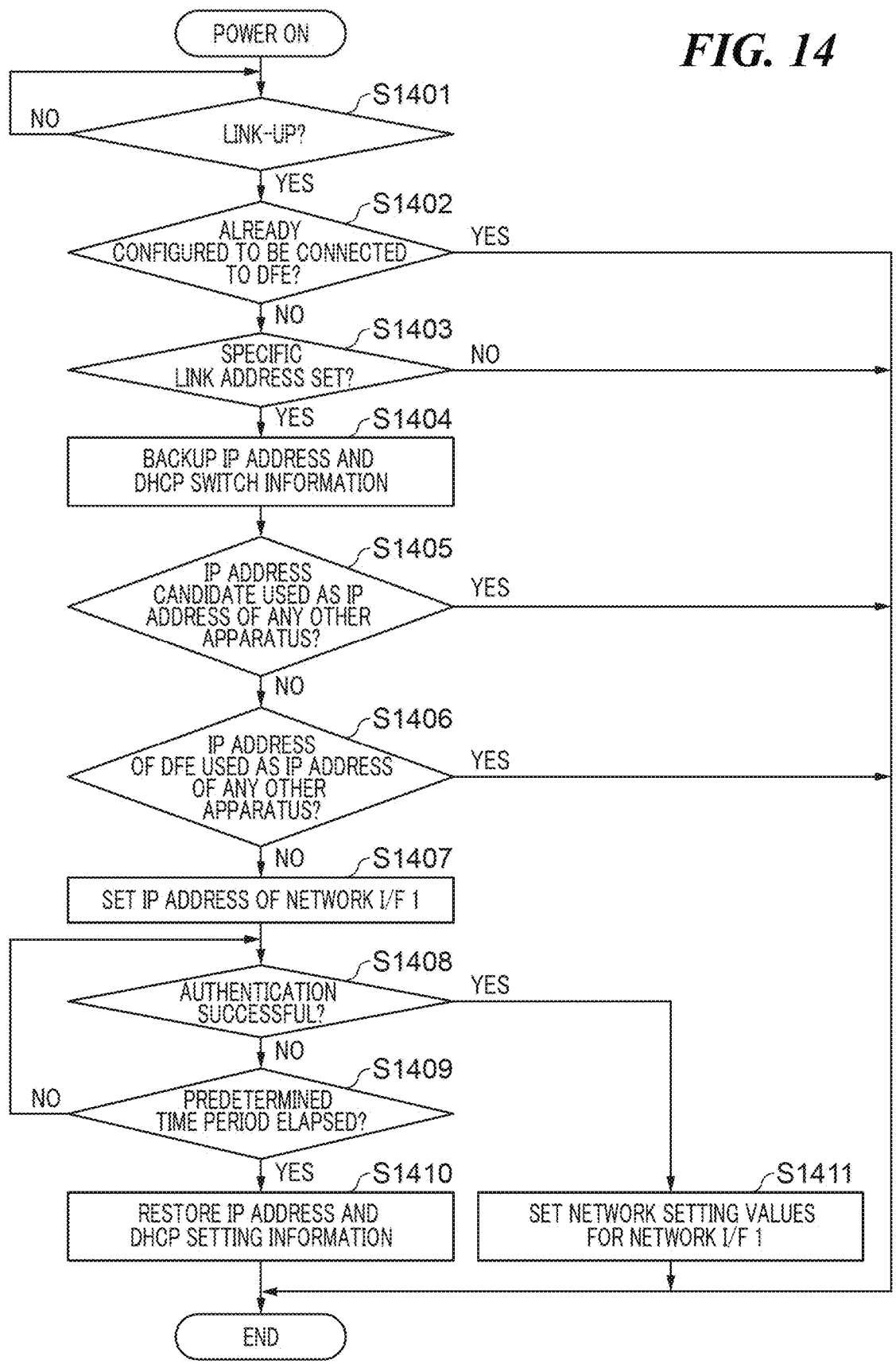
FIG. 14 is a flowchart showing the procedure of a network setting process which is carried out by the MFP in FIG. 1.

FIG. 14 is a flowchart showing the procedure of a network setting process which is carried out by the MFP 106 in FIG. 1. The network setting process in FIG. 14 is implemented by the CPU 401 of the MFP 106 executing a program stored in the ROM 403. The network setting process in FIG. 14 is carried out independently in threads of programs monitoring the respective networks I/Fs 1 and 2 when the MFP 106 is started. The following description will be given of a process which is carried out in a thread of a program for the network I/F 1. In the present embodiment, when link-up relating to the network I/F 2 is detected while the network setting process is being carried out, the network setting process for the network I/F 2 is carried out concurrently.

Referring to FIG. 14, first, the CPU 401 stands by until it detects link-up relating to the network I/F 1. Upon detecting, for example, link-up of the second network 102 as the link-up relating to the network I/F 1 (YES in step S1401), the CPU 401 determines whether or not the MFP 106 has already been connected to the DFE 105 (step S1402). In the step S1402, when network setting values for the network I/F 1 were configured at the time of the previous startup or the like, the CPU 401 determines that the MFP 106 has already been connected to the DFE 105. On the other hand, when no network setting values for the network I/F 1 were configured, the CPU 401 determines that the MFP 106 has not yet been connected to the DFE 105.

As a result of the determination in the step S1402, when the MFP 106 has already been connected to the DFE 105, the CPU 401 ends the present process. As a result of the determination in the step S1402, when the MFP 106 has not yet been connected to the DFE 105, the CPU 401 refers to an IP address of the network I/F 1 to determine whether or not a specific link address is set (step S1403). The specific link address is a specific IP address that is set when no IP address is obtained using DHCP, and for example, "0.0.0.0" (initial value) or "169.54.x.x."

As a result of the determination in the step S1403, when no specific link address is set, the CPU 401 ends the present process. As a result of the determination in the step S1403, when the specific link address is set, the CPU 401 backups the IP address of the network I/F1 and DHCP switch information (step S1404). Then, the CPU 401 uses an arp command to determine whether or not an IP address that is a candidate to be set, for example, 10.1.1.1 is used as an IP address of another apparatus on the second network 102 (step S1405). The arp command is a command that manages association between IP addresses and MAC addresses of communication apparatuses on a network. With the arp command, it is possible to ascertain whether or not there is a communication apparatus to which a specific IP address is assigned on a network.

As a result of the determination in the step S1405, when the IP address that is the candidate to be set is used as an IP address of another apparatus on the second network 102, the CPU 401 determines that the MFP 106 is not in an environment where it can communicate with the DFE 105 in the second network 102 and ends the present process.

As a result of the determination in the step S1405, when the IP address that is the candidate to be set is not used as an IP address of another apparatus on the second network 102, the CPU 401 carries out a process in step S1406. In the step S1406, the CPU 401 determines whether or not an IP address of the DFE 105 is used as an IP address of another apparatus on the second network 102.

As a result of the determination in the step S1406, when the IP address of the DFE 105 is used as an IP address of another apparatus on the second network 102, the CPU 401 determines that the MFP 106 is not in an environment where it can communicate with the DFE 105 in the second network 102 and ends the present process.

As a result of the determination in the step S1406, when the IP address of the DFE 105 is not used as an IP address of another apparatus on the second network 102, the CPU 401 sets an IP address of the network I/F 1 (step S1407). Specifically, the CPU 401 sets an address 10.1.1.1, which has been determined by the arp command that it is not used as an IP address of another apparatus on the second network 102, as the IP address of the network I/F 1. Then, the CPU 401 sends an authentication request to the IP address of the DFE 105. After that, the CPU 401 determines whether or not authentication is successful (step S1408). In the step S1408, for example, when an authentication response is received from the DFE 105, the CPU 401 determines that authentication is successful. On the other hand, when no authentication response is received from the DFE 105, the CPU 401 determines that authentication is not successful.

As a result of the determination in the step S1408, when authentication is not successful, the CPU 401 determines whether or not a predetermined time period set in advance has elapsed since the authentication request was sent (step S1409).

As a result of the determination in the step S1409, when the predetermined time period has not elapsed since the authentication request was sent, the CPU 401 resends the authentication request to the IP address of the DFE 105, and the process returns to the step S1408. As a result of the determination in the step S1409, when the predetermined time period has elapsed since the authentication request was sent, the CPU 401 restores the IP address set in the step S1407 to a backed-up IP address and also restores the DHCP setting information. The CPU 401 then ends the present process.

As a result of the determination in the step S1408, when authentication is successful, the CPU 401 sets network setting values for the network I/F 1 other than an IP address (step S1411) and ends the present process.

In the process in FIG. 14 described above, what to display on a network setting screen is determined based on detection of link-up of the second network 102. As a result, what to display on a network setting screen can be appropriately determined without requiring the user to configure settings on the DFE connection setting screen 705, and hence input errors in network settings can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-017990, filed Feb. 4, 2019, which is hereby incorporated by reference herein in its entirety.

What is claimed is:

1. An image forming apparatus that has a plurality of network I/Fs, to which network setting values are configured to be set by a user's input-operation, and connects an image formation control apparatus to one of the plurality of network I/Fs, the image forming apparatus comprising at least one processor and/or a circuit configured to function as:
   a unit configured to perform a predetermined setting process for setting predetermined network setting values for the image formation control apparatus on one network I/F out of the plurality of network I/Fs, without setting values being entered by a user's input-operation; and
   a display control unit configured to display a screen on which information on the plurality of network I/Fs are listed and displayed,
   wherein the screen includes information indicating that the network setting values for the image formation control apparatus has been set as information on a network I/F for which the network setting values are set by the predetermined setting process.

2. The image forming apparatus according to claim 1, wherein in a case where the display control unit is instructed to display a network setting screen for the one network I/F to which the image formation control apparatus is connected, the display control unit displays a network setting screen on which specific network setting values, which are assigned to the image forming apparatus on a specific network on which the image forming apparatus carries out communications via the image formation control apparatus, have been entered.

3. The image forming apparatus according to claim 2, wherein the display control unit displays setting fields, in which the specific network setting values have been entered, on the network setting screen in a predetermined form indicating that the network setting values have previously been configured.

4. The image forming apparatus according to claim 3, wherein in the network setting screen, user's operations on the setting fields in which the specific network setting values have been entered are not accepted.

5. The image forming apparatus according to claim 3, wherein the network setting screen includes other setting fields in which other network setting values assigned to the image forming apparatus on another network other than the specific network are to be entered.

6. The image forming apparatus according to claim 3, wherein the display control unit provides notification that the specific network setting values have previously been configured.

7. The image forming apparatus according to claim 3, wherein the display control unit does not accept a predetermined operation that commands displaying of the network setting screen on which the specific network setting values have been entered.

8. The image forming apparatus according to claim 2, wherein the specific network setting values include an IP address, a subnet mask, and a gateway address assigned to the image forming apparatus on the specific network.

9. A control method for an image forming apparatus that has a plurality of network I/Fs, to which network setting values are configured to be set by a user's input-operation, and connects an image formation control apparatus to one of the plurality of network I/Fs, comprising a memory storing a program, and at least one processor executing the program to:

perform a predetermined setting process for setting predetermined network setting values for the image formation control apparatus on one network I/F out of the plurality of network I/Fs, without setting values being entered by a user's input-operation; and display a screen on which information on the plurality of network I/Fs are listed and displayed, wherein the screen includes information indicating that the network setting values for the image formation control apparatus has been set as information on a network I/F for which the network setting values are set by the predetermined setting process.

10. A non-transitory computer-readable storage medium storing a program causing a computer to execute a control method for an image forming apparatus that has a plurality of network I/Fs, to which network setting values are configured to be set by a user's input-operation, and connects an image formation control apparatus to one of the plurality of network I/Fs, the image forming apparatus comprising a memory storing a program, and at least one processor executing the program to:

perform a predetermined setting process for setting predetermined network setting values for the image formation control apparatus on one network I/F out of the plurality of network I/Fs, without setting values being entered by a user's input-operation; and display a screen on which information on the plurality of network I/Fs are listed and displayed, wherein the screen includes information indicating that the network setting values for the image formation control apparatus has been set as information on a network I/F for which the network setting values are set by the predetermined setting process.

11. The image forming apparatus according to claim 1, wherein the screen includes a cancel button to be used for performing predetermined setting process again to set another network I/F different from the one network I/F.

* * * * *